US012579569B2

(12) United States Patent
Mesard et al.

(10) Patent No.: US 12,579,569 B2
(45) Date of Patent: Mar. 17, 2026

(54) AUTOMATIC GENERATION OF PERSONALIZED COLLECTION OF ITEMS AROUND A THEME AT AN ONLINE SYSTEM

(71) Applicant: Maplebear Inc., San Francisco, CA (US)

(72) Inventors: Madeline Mesard, New York, NY (US); Brent Scheibelhut, Toronto (CA); Shaun Navin Maharaj, Vaughan (CA)

(73) Assignee: Maplebear Inc., San Francisco, CA (US)

( * ) Notice: Subject to any disclaimer, the term of this patent is extended or adjusted under 35 U.S.C. 154(b) by 280 days.

(21) Appl. No.: 18/485,581

(22) Filed: Oct. 12, 2023

(65) Prior Publication Data

US 2025/0124484 A1 Apr. 17, 2025

(51) Int. Cl.

| | |
|---|---|
| ***G06Q 30/00*** | (2023.01) |
| ***G06F 40/40*** | (2020.01) |
| ***G06Q 30/0204*** | (2023.01) |
| ***G06Q 30/0601*** | (2023.01) |

(52) U.S. Cl.

CPC ......... *G06Q 30/0631* (2013.01); *G06F 40/40* (2020.01); *G06Q 30/0205* (2013.01)

(58) Field of Classification Search

CPC ............................................... G06Q 30/06–08

See application file for complete search history.

(56) References Cited

U.S. PATENT DOCUMENTS

| | | | | |
|---|---|---|---|---|
| 6,708,174 | B1 * | 3/2004 | Tenorio | G06F 16/24578 |
| 10,991,028 | B1 * | 4/2021 | Aubrey | G06Q 30/0641 |
| 2023/0259997 | A1 * | 8/2023 | Vijay | G06Q 30/0603<br>705/27.2 |
| 2024/0289361 | A1 * | 8/2024 | Batina | G06F 16/3328 |

* cited by examiner

*Primary Examiner* — Ethan D Civan

(74) *Attorney, Agent, or Firm* — Fenwick & West LLP

(57) ABSTRACT

An online system automatically generates a personalized collection of items around a theme. The online system generates a prompt for input into a language model, the prompt including information about a plurality of items and a text describing the theme around which the collection of items will be built. The online system requests the language model to generate, based on the prompt, a list of products eligible for building the collection of items. The online system accesses a computer model trained to identify a set of items personalized for a user of the online system. The computer model identifies, based on the list of eligible products and information about the user, the set of items for populating the collection of items. The online system causes a device of the user to display a user interface with the collection of items for inclusion into a cart of the user.

18 Claims, 5 Drawing Sheets

Obtain Text Describing Theme Around Which Collection Of Items
Is To Be Built
405

Generate Prompt For Input Into Large Language Model, Prompt
Including Information About Plurality Of Items And Text Describing
Theme
410

Request Large Language Model To Generate, Based On Prompt
Input Into Large Language Model, List Of Products Eligible For
Building Collection Of Items
415

Access Computer Model Trained To Identify Set Of Items
Personalized For User Of Online Concierge System
420

Apply Computer Model To Identify, Based On List Of Eligible
Products And Information About User, Set Of Items For Populating
Collection of Items
425

Cause Device Of User To Display User Interface With Collection
Of Items For Inclusion Into Cart Of User
430

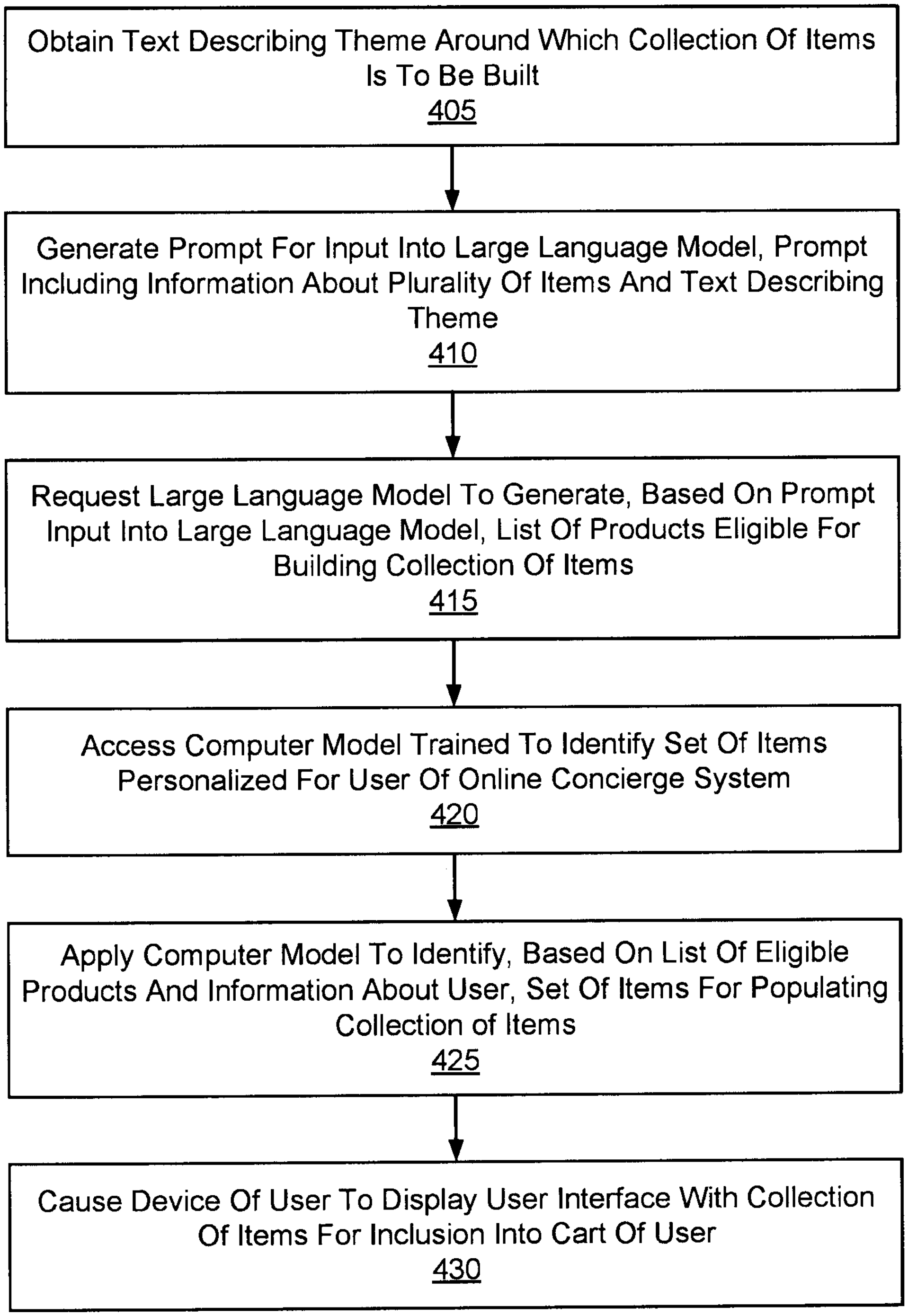

FIG. 4

AUTOMATIC GENERATION OF PERSONALIZED COLLECTION OF ITEMS AROUND A THEME AT AN ONLINE SYSTEM

BACKGROUND

Online systems, such as online concierge systems, maintain repositories of a large variety of items. It is desirable to build, using a repository of items maintained at an online concierge system, a collection of items around a coherent theme for presentation to a user of the online concierge system. Retailers associated with the online concierge system often work within the limitations of physical space (e.g., in a store or on their storefront page) and their own employee pool. Thus, creating new collections is a manual effort in which a retailer (e.g., merchandising manager or marketer) would create a new collection of items, select all the relevant product stock-keeping units (SKUs) they want to include, name the new collection of items, and choose the placement on the website. Furthermore, the merchandising manager should be able to see all of the items that are eligible to be in a collection, and then to predict what items (i.e., products or themes) would be the most appropriate to be shown to an individual user. Currently, merchandising collections are the same for every user, thus causing retailers to waste valuable space on items or collections that may not be relevant to some users. Additionally, retailers currently need to understand trends and seasonal opportunities themselves, which can suffer from the late detection of trends and seasonal opportunities.

Therefore, the current process for generating collections of items around a coherent theme is highly manual and thus not scalable. It should be also noted that it is not technically achievable to just run a query to find items that share a common attribute, which would be a conventional way to generate collections of items using an automated process at the online concierge system. This leads to a technical problem of how to automatically generate a collection of items around a coherent theme that is personalized for a specific user and at a large scale required by the online concierge system.

SUMMARY

Embodiments of the present disclosure are directed to utilizing a language model and a trained computer model to automatically generate a collection of items around a coherent theme, wherein the generated collection of items is personalized for a specific user of an online system (e.g., online concierge system).

In accordance with one or more aspects of the disclosure, the online system obtains a text describing a theme around which a collection of items is to be built. The online system generates a prompt for input into a large language model (LLM), the prompt including information about a plurality of items and the text describing the theme. The online system requests the LLM to generate, based on the prompt input into the LLM, a list of products eligible for building the collection of items. The online system accesses a computer model of the online system trained to identify a set of items personalized for a user of the online system. The online system applies the computer model to identify, based on the list of eligible products and information about the user, the set of items for populating the collection of items. The online system causes a device of the user to display a user interface with the collection of items for inclusion into a cart of the user.

BRIEF DESCRIPTION OF THE DRAWINGS

FIG. 4 is a flowchart for a method of using a language model and a computer model to automatically generate a collection of items around a theme at an online concierge system, in accordance with one or more embodiments.

DETAILED DESCRIPTION

Figure 1A:
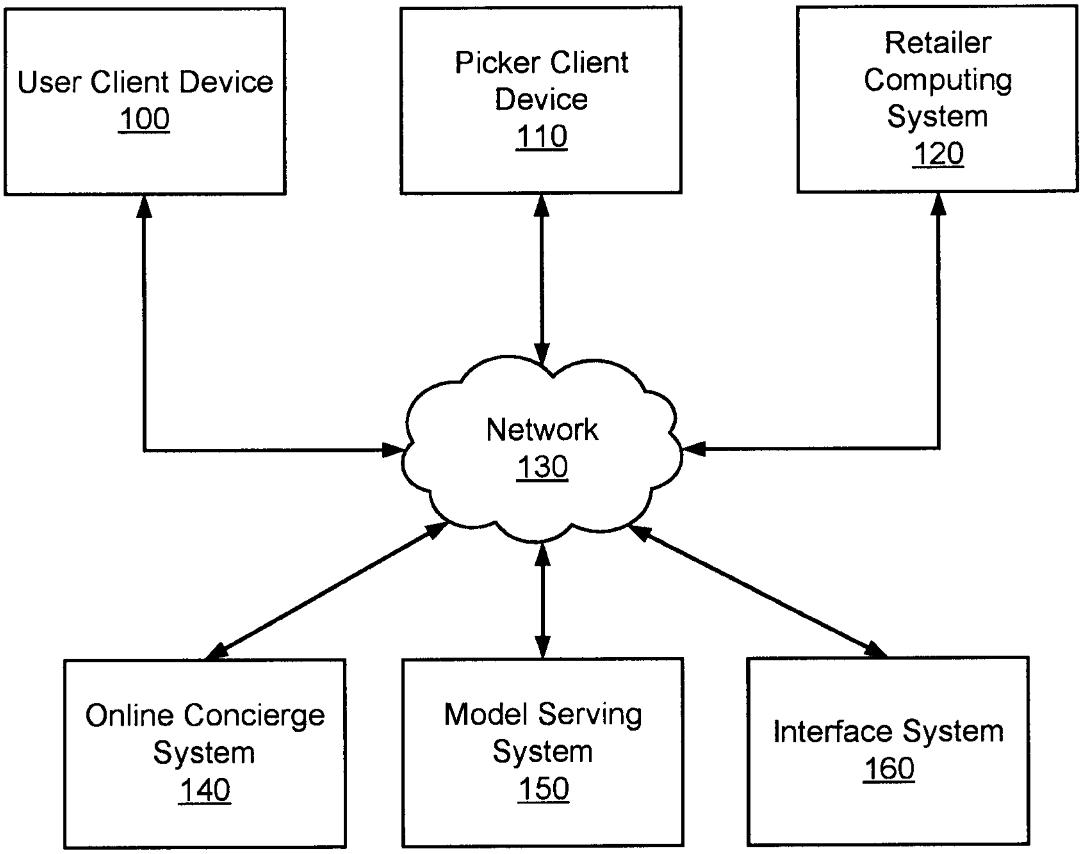
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1A includes a user client device 100, a picker client device 110, a retailer computing system 120, a network 130, an online concierge system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1A, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item", as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from a user client device 100 through the network 130. The online concierge system 140 selects a picker to service the user's order and transmits the order to a picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The model serving system 150 receives requests from the online concierge system 140 to perform tasks using machine-learning models. The tasks include, but are not limited to, natural language processing (NLP) tasks, audio processing tasks, image processing tasks, video processing tasks, and the like. In one or more embodiments, the machine-learning models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model). Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learning model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include websites, articles, posts on the web, and the like. From this massive amount of data coupled with the computing power of the LLM, the LLM is able to perform various tasks and synthesize and formulate output responses based on information extracted from the training data.

In one or more embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The online concierge system 140 maintains a repository of items (i.e., database) that users can access, view, purchase, or otherwise interact with. To promote the items from the repository, the online concierge system 140 generates a collection of items from the repository around a specific theme (e.g., "Taco Dinner"), without requiring manual curation of the collection of items. Instead, the online concierge system 140 determines a theme for each collection of items, which may be received from a human curator or automatically generated by gathering trending items and prompting the LLM of the model serving system 150 to provide possible themes. With each generated theme, the online concierge system 140 then prompts the LLM to generate a set of items from the repository of items maintained by the online concierge system 140 that match the theme. The LLM may be pre-trained with information specific to the online concierge system 140. When a user visits the online concierge system 140, the online concierge system 140 selects a subset of the items for a given theme based on the user's preferences, and then provides a collection of items in a user interface (e.g., in a scrollable unit) of the user client device 100.

The time-consuming process of manual curation of collection of items around a theme is eliminated herein by leveraging the LLM of the model serving system 150 that can identify relevant products based on the prompts. For example, a merchandising manager may provide a human curated prompt for input to the LLM such as, "Make a collection for Thanksgiving", and the LLM may return a response with relevant stock-keeping units (SKUs). This would allow retailers to create more collections, thus providing a large scale required by the online concierge system 140. Furthermore, integrating the online concierge system 140 with the LLM allows the online concierge system 140 to be adaptable and pick up on trends from both internal and external sources for identifying common themes. For example, if there is a viral recipe on social media, the online concierge system 140 integrated with the LLM can capture the trending searches and discourse, and identify the products and applicable name for a collection. In such cases, the online concierge system 140 may algorithmically generate an appropriate prompt for input to the LLM, e.g., "Make baked feta pasta". Additionally, when generating, e.g., the "Thanksgiving" collection, the online concierge system 140 can leverage internal data to create a personalized "Your Thanksgiving Items" collection, in which the mix of items is specific for each user. For example, the online concierge system 140 would not show turkey in personalized "Your Thanksgiving Items" collections to vegetarian users.

The online concierge system 140 may prepare (e.g., via a prompt generation module 260 in FIG. 2) a prompt for input into the LLM of the model serving system 150. The prompt may include certain repository data of the online concierge system 140 so that the LLM would generate a personalized collection of items for a specific user of the online concierge system 140. In one or more embodiments, the online concierge system 140 includes in the prompt information about the user's preferences (e.g., favorite brands, type of products, etc.), their geographic location, type (e.g., cohort) to which the user belongs to, trending data, etc. The online concierge system 140 may prepare the prompt for input into the LLM by including in the prompt information about an individuals' purchasing behavior and/or the taxonomy of all products, which can be used by the LLM to identify appropriate items for the collection. An example prompt for input to the LLM may include the following transcript.

> "You are a product merchandising manager. Please create a personalized collection for <User Grouping Type X> who likes <Brands X> and <Brand Y>. The week over week search growth for search terms are <Z>. Please group them together based on <A, B, C>. Third party trending data indicates that during the current season of <Season> products in categories <D, E, F> are currently trending. Here are some historical trends on products in this category: <G, H, I>."

The online concierge system 140 may prepare the prompt for input to the LLM by further including in the prompt information about a theme (e.g., name and/or short description of the theme) around which the collection of items is to be built. In one or more embodiments, a merchandising manager is responsible for defining a description and/or name of a theme (i.e., type of products) desired for a collection of items, such as “Items for taco night”, “Christmas gifts”, “Gluten free items”, “Healthy back to school snacks”, etc. In such cases, the manually curated prompt may represent a name or description for a collection of items. In one or more other embodiments, the online concierge system 140 algorithmically generates (e.g., via a theme generation module 250 in FIG. 2) information about the theme (e.g., name and/or short description of the theme) for inclusion in the prompt for input into the LLM. The online concierge system 140 may leverage trending sales data and searches to determine appropriate types of products (i.e., themes). The online concierge system 140 (or, alternatively, the merchandising manager) may further include in the prompt a list of past collections used for the specific theme or holiday along with specific products for promotion (e.g., one or more advertised products, a brand store that the collection will be displayed at, etc.). The online concierge system 140 (or, alternatively, the merchandising manager) may also include in the prompt one or more items that are typically out of stock for a particular store.

The online concierge system 140 may receive a response to the prompt from the model serving system 150 based on execution of the machine-learning model using the prompt. The response may include a list of products that are eligible for the collection of items. For example, for the prompt that includes “Taco Night” theme and corresponding trending data, the response may include the list of products, such as: lettuce, ground beef, impossible ground beef, tomatoes, cheese, tortillas, taco shells, salsa, etc. Hence, the response may include a list of products that are related to a description and/or name of the theme as provided in the prompt. Alternatively or additionally, the response may include a list of products along with a name to describe the collection (e.g., in the case when the prompt is algorithmically generated). The online concierge system 140 may import the response from the model serving system 150 and use the response to match (e.g., via a computer model of the online concierge system 140) the list of products with relevant items from a repository of items maintained at the online concierge system 140. The matching may be personalized for a particular user of the online concierge system 140 so that the online concierge system 140 generates the collection of items around a theme that is unique and appropriate for the particular user.

In one or more embodiments, the task for the model serving system 150 is based on knowledge of the online concierge system 140 that is fed to the machine-learning model of the model serving system 150, rather than relying on general knowledge encoded in the model weights of the model. Thus, one objective may be to perform various types of queries on the external data in order to perform any task that the machine-learning model of the model serving system 150 could perform. For example, the task may be to perform question-answering, text summarization, text generation, and the like based on information contained in an external dataset.

In one or more embodiments, the online concierge system 140 is connected to the interface system 160. The interface system 160 receives external data from the online concierge system 140 and builds a structured index over the external data using, for example, another machine-learning language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online concierge system 140 can generate a prompt using the external data as context, often times, the amount of information in the external data exceeds prompt size limitations configured by the machine-learning language model. The interface system 160 can resolve prompt size limitations by generating a structured index of the data and offers data connectors to external data sources.

Figure 1B:
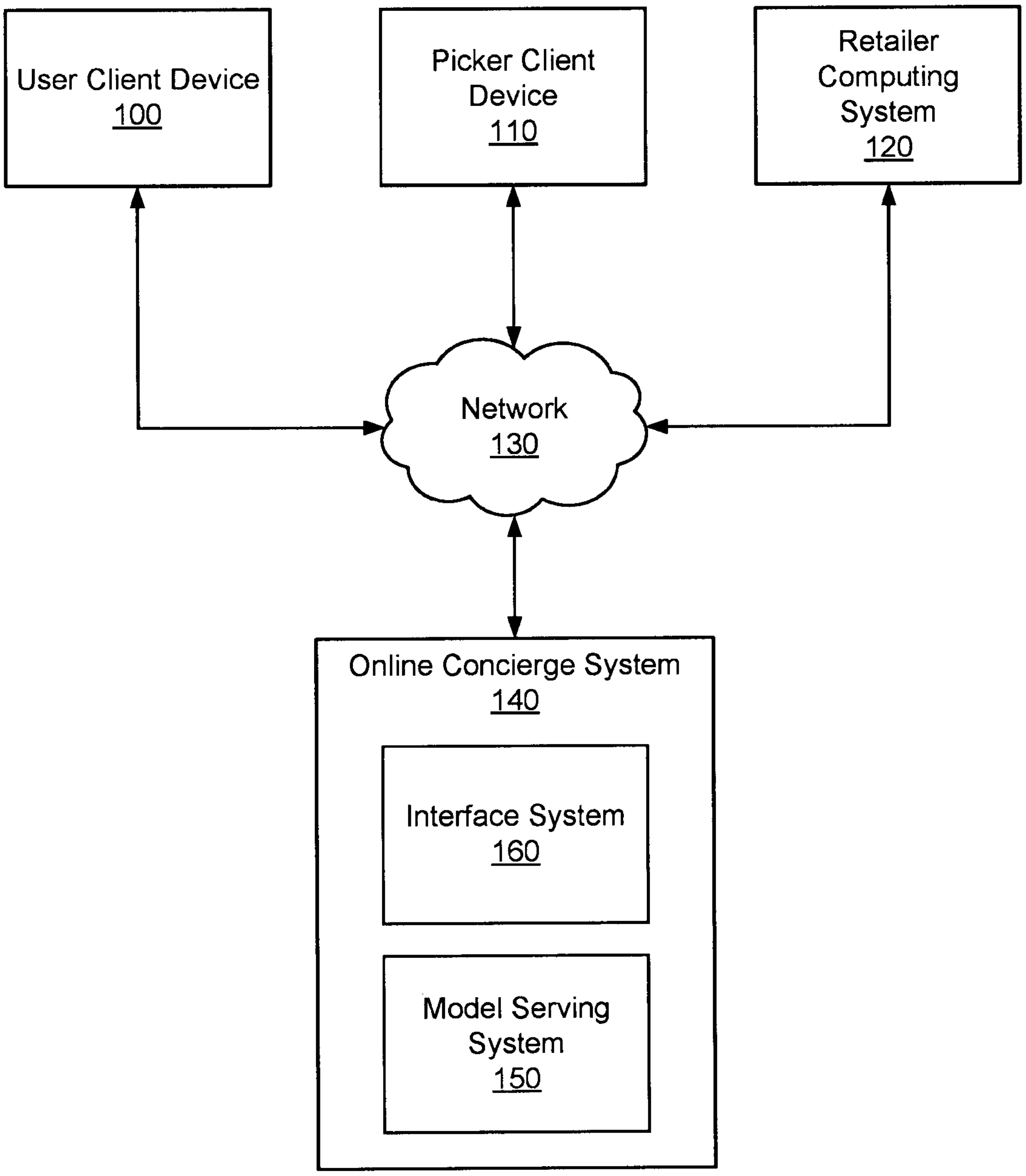
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a user client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140. The online concierge system 140 is described in further detail below with regards to FIG. 2.

Figure 2:
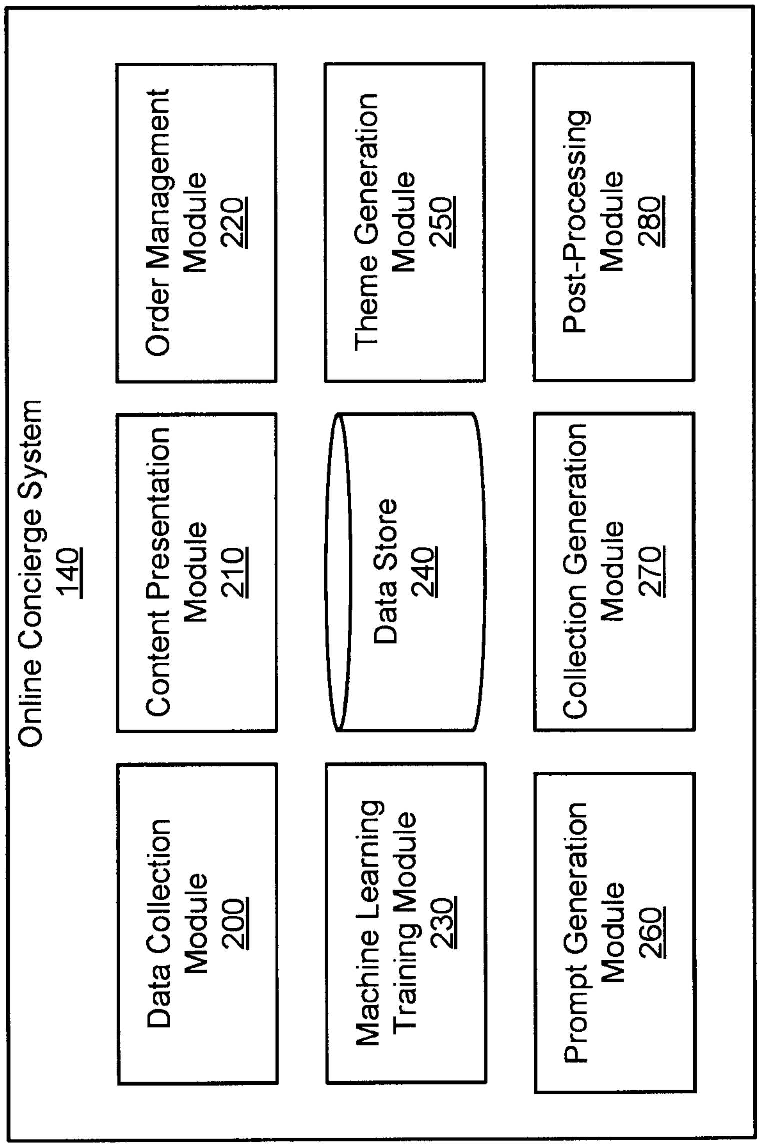
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, a theme generation module 250, a prompt generation module 260, a collection generation module 270, and a post-processing module 280. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. User data may include a user’s name, address, shopping preferences, favorite items, or stored payment instruments. The user data also may include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a user rating for the picker, which retailers the picker has collected items at, or the picker's previous shopping history. Additionally, the picker data may include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learning models hosted by the model serving system 150, the machine-learning models may already be trained by a separate entity from the entity responsible for the online concierge system 140. In one or more other embodiments, when the model serving system 150 is included in the online concierge system 140, the machine-learning training module 230 may further train parameters of the machine-learning model based on data specific to the online concierge system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

The theme generation module 250 may obtain a text describing a theme around which a collection of items is to be built. The text describing the theme may include a name of the theme and/or a short description of the theme. In one or more embodiments, the text describing a theme is human generated (e.g., written and curated by a merchandising manager or marketer), such as "Taco dinner collection", "Christmas gift collection", etc. In such cases, the theme generation module 250 may receive the text describing the theme, parse the received text, and provide the parsed text, e.g., the prompt generation module 260.

In one or more other embodiments, the theme generation module 250 algorithmically generates the text describing the theme. In such cases, the theme generation module 250 may first detect various trending data (e.g., trends in sales for specific items) to determine a list of trending products. Then, the theme generation module 250 may perform abstraction of the trending products that top a category level using taxonomy to generate a text describing a trending theme. Alternatively, the theme generation module 250 may prompt a LLM (e.g., of the model serving system 150) with the list of trending products to provide one or more themes that are related to one or more of the trending products. Additionally, the theme generation module 250 may ask the LLM to rank a relevance of each trending product to each theme. The theme generation module 250 may pass the ranked relevance of each trending product to, e.g., the prompt generation module 260.

The prompt generation module 260 may generate a prompt for input into a LLM (e.g., of the model serving system 150), the prompt including information about one or more items (e.g., as retrieved from the data store 240), the text describing the theme, and a request for generating a list of products that are eligible for building a collection of items around the theme. In one or more embodiments, the prompt for input into the LLM includes trending data as well as information about a user of the online concierge system 140. In such case, the prompt for input into the LLM may include, but not limited to: (1) information about a user's category; (2) shopping history of the user; (3) user's category region; (4) trending data associated with the region; and/or (5) current trending products.

In one or more embodiments, the prompt generation module 260 uses a template populated with the text describing the theme (e.g., the manually curated text) to generate the prompt for input into the LLM. In one or more other embodiments, the prompt generation module 260 generates the prompt for input into the LLM by including in the prompt information about trending product purchases, trending search terms, information about online trends, etc. The trending products and/or trending search terms included in the prompt may be detected by the theme generation module 250, the prompt generation module 260, or some other module of the online concierge system 140. In such cases, the prompt for input into the LLM may not necessarily include a text describing a theme (e.g., human generated theme). Based on the prompt input into the LLM, the LLM may group certain products together as one or more new collections of products that are eligible for building one or more new collections of items. The online concierge system 140 may provide a toggle on/off option to a merchandising manager (e.g., via the retailer computing system 120) for each new collection so that the merchandising manager can approve or disapprove that new collection.

In one or more embodiments, the prompt generation module 260 (or some other module of the online concierge system 140) detects trending data (e.g., week over week (WoW) increase in sale for certain products) using search and purchase data available at a database of the online concierge system 140 (e.g., at the data store 240). The prompt generation module 260 may then include the detected trending data into the prompt for input into the LLM. In one example, the prompt generation module 260 (or some other module of the online concierge system 140) may detect a seasonal increase every year in March of the number of pies and frozen pizzas being purchased. After prompting the LLM with this information, the LLM may create a collection of pies and suggest naming the collection as, e.g., "Celebrate Pi Day on 3/14". In another example, the prompt generation module 260 (or some other module of the online concierge system 140) may detect online search trends indicating that there is a trending recipe on social media, as well as an increase in sales of feta and cherry tomatoes. After prompting the LLM with this information, the LLM may create a collection of ingredients for a theme, e.g., "Make the Viral Baked Feta Pasta". In each of these cases, the prompt generation module 260 may utilize unique data maintained at the database of the online concierge system 140 as well as trending data from external sources to feed the LLM for determination of a new collection theme and appropriate products for populating the new collection.

A response generated by the LLM may include a list of products that are specific for a particular type of user. Alternatively, the response generated by the LLM includes a list of products that are not specific for any particular type of user. In either case, the list of products generated by the LLM includes products across different retailers and categories of products that still need to be mapped to a catalog of items maintained at the online concierge system 140 (e.g., as available at the data store 240). The prompt generation module 260 may import the response generated by the LLM and feed the response to a personalization machine-learning computer model (e.g., a computer model deployed by the collection generation module 270). The response generated by the LLM may thus represent a customized collection of products for the user grouping. The online concierge system 140 may utilize the customized collection of products and personalize it further for an individual user in the user grouping.

The collection generation module 270 may determine, from the list of products generated by the LLM, a set of items for populating the collection of items, wherein the determined set of items are personalized for a specific user of the online concierge system 140. In one or more embodiments, the collection generation module 270 applies a first computer model (e.g., machine-learning computer model) trained to determine the set of items for populating the collection of items, based on the list of eligible products generated by the LLM and information about the user. The first computer model deployed by the collection generation module 270 may run a machine-learning algorithm to determine the set of items based on one or more user's preferences (e.g., vegetarian diet), a location of a retailer relative to a location of the user, information about user's historic purchases, some other user's information, or some combination thereof. Hence, the first computer model deployed by the collection generation module 270 is trained to operate as a personalization machine-learning computer model and can be referred to as a "personalization model". A set of parameters for the first computer model deployed by the collection generation module 270 may be stored on one or more non-transitory computer-readable media of the collection generation module 270. Alternatively, the set of parameters for the first computer model deployed by the collection generation module 270 may be stored on one or more non-transitory computer-readable media of the data store 240.

The collection generation module 270 may apply the first computer model to rank the list of eligible products generated by the LLM based on information about the user (e.g., the user's preferences, location of the user relative to a corresponding retailer's location, etc.) and determine a rank for each product in the list of eligible products. The collection generation module 270 may select a subset of products from the list of eligible products (e.g., a predetermined number of eligible products) based on the determined rank for each product in the list of eligible products. The collection generation module 270 may then map the selected subset of products to a set of items from a repository of items maintained at the online concierge system 140 (e.g., at the data store 240), and populate the collection of items with the mapped set of items.

The machine-learning training module 230 may retrain (or, more generally, update) the set of parameters of the first computer model using information about a conversion of each item from the collection of items by the user. Training data may be obtained (e.g., via the machine-learning training module 230 or some other module of the online concierge system 140) by grouping those collections of items or individual items that perform well with the user (e.g., having a conversion rate above a threshold rate), and as well as grouping those collections of items or individual items that do not perform well with the user (e.g., having a conversion rate below the threshold rate). The machine-learning training module 230 may then use the training data to update the parameters of the first computer model.

In one or more embodiments, the collection generation module 270 applies a second computer model (e.g., machine-learning computer model) trained to predict a likelihood for availability of each item in the mapped set of items, based on one or more features of each item in the mapped set of items, information about a corresponding retailer associated with each item in the mapped set of items, etc. The second computer model deployed by the collection generation module 270 may run a machine-learning algorithm to determine an availability score for each item in the mapped set of items, based on the predicted likelihood for availability. Upon determination of the availability score for each item in the mapped set of items, the collection generation module 270 may select a subset of items (e.g., predetermined number of items) from the mapped set of items for populating the collection of items, based on the availability score for each item in the mapped set of items. Hence, the second computer model deployed by the collection generation module 270 is trained to operate as a predictive machine-learning computer model and can be referred to as a "availability model". A set of parameters for the second computer model deployed by the collection generation module 270 may be stored on one or more non-transitory computer-readable media of the collection generation module 270. Alternatively, the set of parameters for the second computer model deployed by the collection generation module 270 may be stored on one or more non-transitory computer-readable media of the data store 240.

In addition to the item availability, the second computer model deployed by the collection generation module 270 may optimize the final collection of items by putting more weights to one or more advertised items in the mapped set of items and/or considering a retailer revenue for each item in the mapped set of items. Thus, the second computer model may improve the retailer's discoverability as well as the retailer's revenue margins. Furthermore, the second computer model may be trained to determine a subset of the mapped set of items for populating the collection of items based on which retailer has the majority of items and/or promotion payments from one or more retailers. The content presentation module 210 may then cause a device of the user (e.g., the user client device 100) to display the user interface with a storefront page that shows the populated collection of items from the promoted retailer.

By deploying the first computer model (i.e., personalization model) and the second computer model (i.e., availability model), the collection generation module 270 may generate the collection of items that is optimized for, e.g., item inventory at user-specific store history, user-specific brand preferences, user-specific product purchasing, user-specific product viewing, and user-specific product interaction data. Hence, the collection generation module 270 may generate the collection of items that represents a user-specific collection of products that is both trending and personalized and in stock at the user's local favorite stores.

The collection of items generated by the collection generation module 270 may be stored as, e.g., an extensible markup language (XML) object into a repository or database maintained at the online concierge system 140 (e.g., at the data store 240). The XML object may include both text and images. The images associated with the XML object may be uniform resource locator (URL) hypertext reference (HREF) attribute links that can be used to load pictures of corresponding items for presentation at, e.g., a user interface of the user client device 100. The text associated with the XML object may include information such as a personalized title for the collection of items, one or more subtitles, a common title for multiple collections, an array of items with personalized images for the items in the collection, etc. The content presentation module 210 may load the XML object from the database and convert the XML object into, e.g., a JavaScript Object Notation (JSON) object for displaying at the user interface of the user client device 100.

When the collection of items is displayed at the user interface of the user client device 100, the user may see only an assortment of relevant items (e.g., the subset of eligible products determined by the LLM). For example, for the "Taco Dinner" collection of items, a gluten free user would only see taco shells, and not flour tortillas. Thus, the auto-generated collection of items would be presented to each user at an individual level, in which each user sees a unique assortment of items and collection themes based on their preferences. Some examples of personalized collections of items displayed at the user interface of the user client device 100 are: "You might be running low on items <A, B, C>", "Refresh your stock (expiring <X, Y> items)", "Your Thanksgiving Menu", "Vegetarian Cook-Out", etc. Displaying the personalized collections of items built around a theme allows the online concierge system 140 to surface buy-it-again (BIA) items that are less frequently purchased, new items based on the user's taste or preferences, seasonal BIA items, etc.

To validate automatically generated collections of items, the post-processing module 280 may perform post-processing of a collection of items generated by the collection generation module 270. Furthermore, the post-processing module 280 may store only those validated collections of items in a catalog maintained at the online concierge system 140 (e.g., at the data store 240). In one or more embodiments, the post-processing module 280 obtains information about conversion performance for each collection of items, and cull one or more collection of items with conversion rates below a threshold rate. In one or more other embodiments, the post-processing module 280 initiates A/B testing of the automatically generated collections of items and keeps for storage only those collections of items that pass the A/B testing with quality scores that exceed a predetermined quality score threshold.

Given a set of items derived using the personalization model (i.e., the first computer model that determines items that a user is most likely to purchase within a duration), the post-processing module 280 may apply additional post-processing to parameters of the personalization model to further cater a collection of items to a specific user. This includes both putting the user into segments based on their likelihood to respond to changes of the personalization model and updating the data/imagery of a campaign collection to the highest potential impression possibility of the user. Furthermore, the post-processing module 280 may initiate presentation of the collection of items only to targeted users who meet an estimated threshold of prediction for conversion, and thus save on multiple broadcasted money spent.

Given that the LLM determines a customized collection of products for the user grouping, the personalization model deployed by the theme generation module 250 may personalize the customized collection of products for an individual user in that user grouping. The post-processing module 280 may apply a third computer model (e.g., machine-learning model) to generate elements of the collection that cater to the individual user, e.g., collection branding, imagery, and/or naming. Inputs to the third computer model may include information about user's preferences, upcoming campaigns the user may be interested in, information about past purchases of the user, etc. In this manner, the user may be more enticed to interact with the generated collection of items. For example, the post-processing module 280 may generate the input for the third computer model based on information that a specific user recorded a successful impression and add-to-cart (ATC) conversion on the "Thanksgiving" collection. Hence, this specific user would be considered by the third computer model for future segments as part of automatic generation of future collections. A set of parameters for the third computer model deployed by the post-processing module 280 may be stored on one or more non-transitory computer-readable media of the post-processing module 280. Alternatively, the set of parameters for the second computer model deployed by the post-processing module 280 may be stored on one or more non-transitory computer-readable media of the data store 240.

In one or more embodiments, the post-processing module 280 provides inputs to the third computer model that include, e.g., past purchases of the user, one or more upcoming campaigns the user is applicable for, one or more past successful campaigns that have sought the user's impressions and resulted in ATC, etc. The third computer model deployed by the post-processing module 280 may calculate, based on the inputs, a confidence score of the user's likelihood of interest in a particular campaign using attributes such as, products within a collection, name of collection, likelihood to respond to imagery, upcoming seasonality, etc. Once the confidence score is calculated, the third computer model deployed by the post-processing module 280 may continuously suggest changes to the aforementioned attributes, and generate new collection names, items, etc. until a confidence level above a threshold level can be reached for the specific user. Additionally, the post-processing module 280 may prompt a language model (e.g., LLM of the model serving system 150) to create one or more collection names that cater to the specific user in order to find a collection name that is more likely to spark interests of the specific user. The post-processing module 280 may save the resulting data for the collection of items for the specific user (as output by the third computer model and the LLM) at a catalog maintained at the online concierge system 140 (e.g., at the data store 240) so that the specific user will have a unique visual of the collection catered to them at the user interface of the user client device 100.

Additionally, the post-processing module 280 may receive the personalized collection of items as generated by the first computer model (i.e., personalization model), and the post-processing module 280 may deploy the third computer model to rank the items from the personalized collection against a catalog of the online concierge system 140 (e.g., as available at the data store 240). The ranking of items from the personalized collection may allow the generation of future collections based on seasons of potential purchase, upcoming interest, purchase history, etc. Rather than solely relying on past purchase history and general recommendations, the third computer model may predict items that a specific user may need and that best cater to this user. For example, if the user was responsive to "Thanksgiving collection" in the past year, the third computer model would ensure to add Thanksgiving-related items to a new collection in higher priority.

Figure 3:
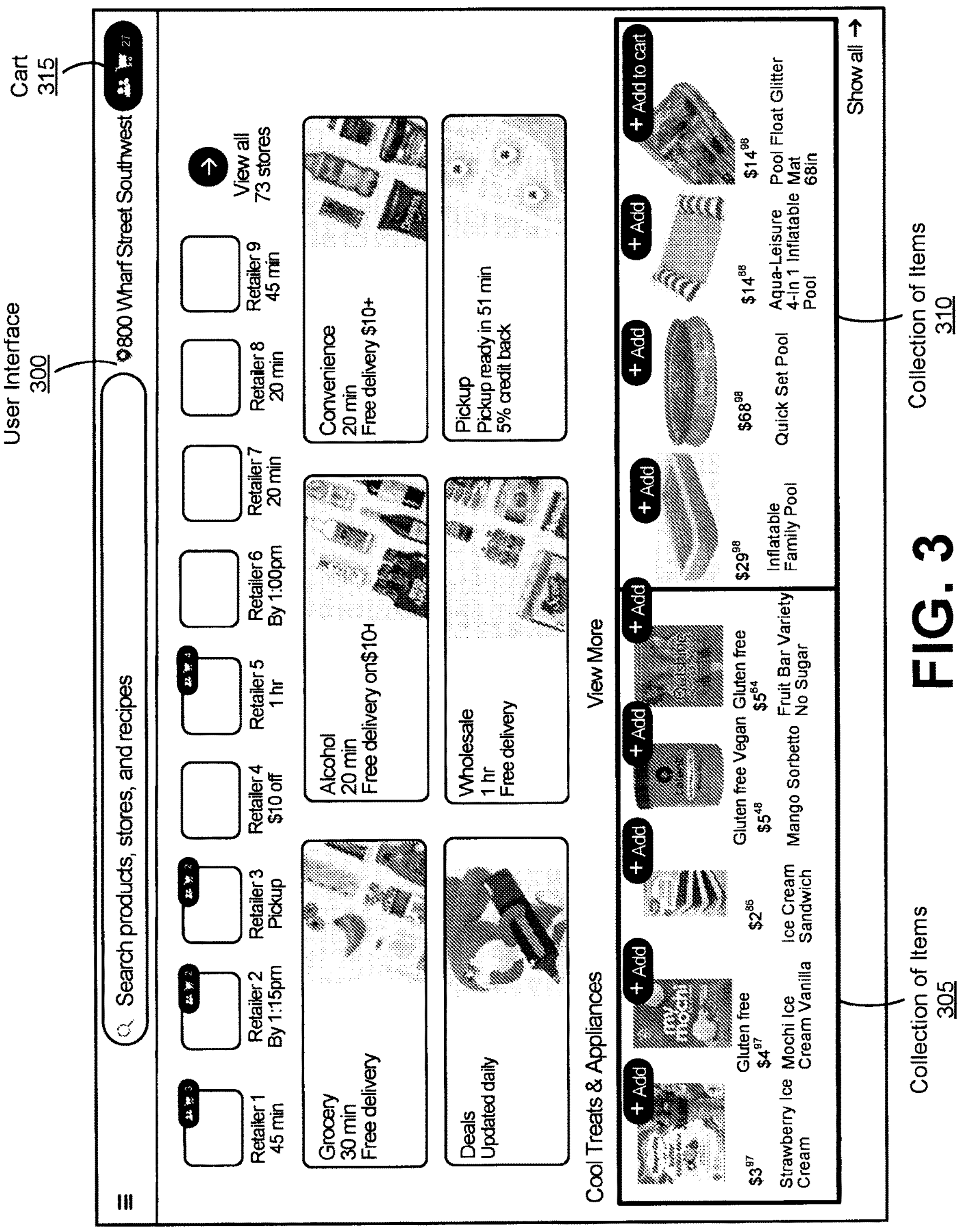
FIG. 3 illustrates an example user interface displayed at a user client device with collections of items generated around different themes, in accordance with one or more embodiments.

FIG. 3 illustrates an example user interface 300 displayed at the user client device 100 with collections of items generated around different themes, in accordance with one or more embodiments. The user interface 300 displayed at the user client device 100 may be a storefront page of the online concierge system 140. The content presentation module 210 may use outputs of the collection generation module 270 (and optionally of the post-processing module 280) to launch collection carousels on the storefront page to, e.g., improve the user's browsing experience (and, optionally, the retailer's merchandising experience). The content presentation module 210 may cause the user client device 100 to display the user interface 300 with a collection of items 305 personalized for a specific user and built around a first theme (e.g., "Cool Treats"). The content presentation module 210 may further cause the user client device 100 to display the user interface 300 with a collection of items 310 personalized for the same specific user and built around a second theme (e.g., "Cool Appliances") different from the first theme.

The first theme associated with the collection of items 305 and/or the second theme associated with the collection of items 310 may be algorithmically generated by the online concierge system 140 based on, e.g., seasonal trends, and input as part of a prompt to a language model (e.g., LLM of the model serving system 150). Alternatively, the first theme and/or the second theme may be manually generated by a human curator (e.g., merchandising manager or marketer) and provided as part of the prompt input to the language model. The content presentation module 210 may further cause the user client device 100 to display the collection of items 305 and the collection of items 310 under a common description, e.g., "Cool Treats & Appliances". The user can use "add buttons" at each item of the collection of items 305 and the collection of items 310 to include that specific item into a cart 315. It should be also noted that the collection of items 305 may include items available by a first retailer, whereas the collection of items 310 may include items available by a second retailer different from the first retailer. Therefore, the automatic generation of personalized collection of items around coherent themes presented herein can be suitable for the multi-retailer marketplace.

FIG. 4 is a flowchart for a method of using a language model and a computer model to automatically generate a collection of items around a theme at an online concierge system, in accordance with one or more embodiments. Alternative embodiments may include more, fewer, or different steps from those illustrated in FIG. 4, and the steps may be performed in a different order from that illustrated in FIG. 4. These steps may be performed by an online concierge system (e.g., the online concierge system 140). Additionally, each of these steps may be performed automatically by the online concierge system without human intervention.

The online concierge system 140 obtains 405 (e.g., via the theme generation module 250) a text describing a theme around which a collection of items is to be built. The online concierge system 140 may identify (e.g., via the theme generation module 250) at least one of a list of trending items or a list of trending search queries associated with the online concierge system 140. The online concierge system 140 may generate (e.g., via the prompt generation module 260) a prompt for input into a LLM (e.g., LLM of the model serving system 150), the prompt including the at least one of the list of trending items or the list of trending search queries. The online concierge system 140 may request (e.g., via the prompt generation module 260) the LLM to generate, based on the prompt input into the LLM, the text describing the theme. Alternatively, online concierge system 140 may receive at least one of a manually generated name of the theme or a manually generated description of the theme.

The online concierge system 140 generates 410 (e.g., via the prompt generation module 260) a prompt for input into a LLM (e.g., LLM of the model serving system 150), the prompt including information about a plurality of items and the text describing the theme. The online concierge system 140 requests 415 (e.g., via the prompt generation module 260) the LLM to generate, based on the prompt input into the LLM, a list of products eligible for building the collection of items. The online concierge system 140 may generate (e.g., via the prompt generation module 260) the prompt for input into the LLM by including in the prompt at least one of a name of the theme or a description of the theme. The online concierge system 140 may generate (e.g., via the prompt generation module 260) the prompt for input into the LLM by further including in the prompt at least one of a type of a cohort the user belongs to, one or more brands preferred by the user, or a geographic location of the user. The online concierge system 140 may retrieve (e.g., via the prompt generation module 260), from a database of the online concierge system 140 (e.g., catalog of items at the data store 240), the plurality of items historically associated with the theme.

The online concierge system 140 accesses 420 a computer model of the online concierge system 140 (e.g., the personalization model deployed by the collection generation module 270) trained to identify a set of items personalized for a user of the online concierge system. The online concierge system 140 applies 425 the computer model (e.g., via the collection generation module 270) to identify, based on the list of eligible products and information about the user, the set of items for populating the collection of items.

The online concierge system 140 may rank (e.g., by applying the computer model), based at least in part on one or more preferences of the user, the list of eligible products to identify a rank for each product in the list of eligible products. The online concierge system 140 may select (e.g., via the collection generation module 270), based at least in part on the identified rank for each product in the list of eligible products, a subset of products from the list of eligible products. The online concierge system 140 may map (e.g., via the collection generation module 270) the selected subset of products to the set of items stored in a database of the online concierge system 140 (e.g., catalog of items at the data store 240).

The online concierge system 140 may rank (e.g., by applying the computer model), based at least in part on a location of a corresponding retailer associated with each item in the list of eligible items, the list of eligible items to identify a rank for each item in the list of eligible items. The online concierge system 140 may select (e.g., via the collection generation module 270), based at least in part on the identified rank for each product in the list of eligible products, a subset of products from the list of eligible products. The online concierge system 140 may map (e.g., via the collection generation module 270) the selected subset of products to the set of items stored in a database of the online concierge system 140 (e.g., catalog of items at the data store 240).

The online concierge system 140 may access a second computer model of the online concierge system 140 (e.g., the availability model deployed by the collection generation module 270) trained to predict, based on at least one of one or more features of each item in the set of items or information about a corresponding retailer associated with each item in the set of items, a likelihood for availability of each item in the set of items. The online concierge system 140 may apply the second computer model (e.g., via the collection generation module 270) to determine, based on the predicted likelihood for availability, an availability score for each item in the set of items. The online concierge system 140 may select (e.g., via the collection generation module 270), based at least in part on the availability score for each item in the set of items, a subset of items from the set of items for populating the collection of items.

The online concierge system 140 causes 430 (e.g., via the content presentation module 210) a device of the user (e.g., the user client device 100) to display a user interface with the collection of items for inclusion into a cart of the user. The online concierge system 140 may populate (e.g., via the collection generation module 270) the collection of items with the determined set of items. The online concierge system 140 may store (e.g., via the collection generation module 270) the populated collection of items as a first object of a first format (e.g., XML format) in a database of the online concierge system 140 (e.g., catalog of items at the data store 240). The online concierge system 140 may load (e.g., via the via the content presentation module 210) the stored collection of items as a second object of a second format (e.g., JSON format) for displaying at the user interface of the device of the user (e.g., the user client device 100).

Embodiments of the present disclosure are directed to the online concierge system 140 that utilizes a language model and a computer model to automatically generate a collection of items around a coherent theme, wherein the generated collection of items is personalized for a specific user of the online concierge system 140. The online concierge system 140 presented herein may also automatically generate a theme around which a collection of items will be built using various trending data (e.g., trending purchasing data and/or trending searches). The online concierge system 140 thus operates as an automated collection tool that generates a personalized collection of products to be merchandised. The automatic approach presented in this disclosure allows scaling of merchandising efforts, quick adaptation to seasons and trends, and personalization of merchandising collections to the user's needs and preferences.

The automated generation of collection of items around a theme as presented herein is formulated to optimize its final output in terms of the availability of items, advertised products, and the respective margins on the products for the retailer. Retailers consistently grapple with ensuring the availability of items, a factor that profoundly impacts the output. The online concierge system 140 presented herein boosts productivity efficiency by optimizing this aspect. Secondly, the online concierge system 140 presented herein harnesses and exploits data from advertised products that plays a monumental role in shaping output optimization. Furthermore, the online concierge system 140 presented herein prudently takes into consideration the margins on the products for the retailer, thereby ensuring that the retailer obtains maximum Return On Investment (ROI).

In the context of retailer discoverability, the online concierge system 140 presented herein plays a pivotal role in fostering the visibility of retailers, thereby boosting their market presence. By upholding a multi-retailer marketplace setting, the online concierge system 140 proves potent in adjusting the output to accommodate for fluctuations. This dynamic ability thus equips the online concierge system 140 with an essential tool for modern retailers operating in an exceedingly competitive and ever-changing marketplace. A user shopping for a marketplace experience can be provided with a set of product catalogs created using a personalization model catered to their past shopping preferences.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

obtaining a text describing a theme around which a collection of items is to be built;

generating a prompt for input into a language model, the prompt including information about a plurality of items and the text describing the theme;

requesting the language model to generate, based on the prompt input into the language model, a list of products eligible for building the collection of items;

accessing a machine-learning model trained to identify a set of items personalized for a user of an online system;

applying the machine-learning model to the list of eligible products and information about the user to identify the set of items for populating the collection of items;

storing, into a database of the computer system, the collection of items as an extensible markup language (XML) object that includes a text and a plurality of images, the plurality of images represented by uniform resource locator (URL) hypertext reference (HREF) attribute links and associated with items in the collection of items, the text associated with the XML object including a personalized title for the collection of items;

loading the XML object from the database, wherein the loading includes using the URL HREF attribute links to load each of the plurality of images for presentation of each item of the collection of items; and upon loading the XML object from the database, converting the XML object into a Javascript Object Notation (JSON) object that causes a device associated with the user to display a user interface with each item of the collection of items including the personalized title for the collection of items and the plurality of images for inclusion of one or more items of the collection of items into a cart of the user.

2. The method of claim 1, wherein obtaining the text describing the theme comprises:

identifying at least one of a list of trending items or a list of trending search queries associated with the online system;

generating a second prompt for input into the language model, the second prompt including the at least one of the list of trending items or the list of trending search queries; and requesting the language model to generate, based on the second prompt input into the language model, the text describing the theme.

3. The method of claim 1, wherein obtaining the text describing the theme comprises:

receiving at least one of a manually generated name of the theme or a manually generated description of the theme.

4. The method of claim 1, wherein generating the prompt for input into the language model comprises:

generating the prompt for input into the language model by including in the prompt at least one of a name of the theme or a description of the theme.

5. The method of claim 1, wherein generating the prompt for input into the language model comprises:

generating the prompt for input into the language model by further including in the prompt at least one of a type of a cohort the user belongs to, one or more brands preferred by the user, or a geographic location of the user.

6. The method of claim 1, wherein generating the prompt for input into the language model comprises:

retrieving, from the database, information about the plurality of items historically associated with the theme.

7. The method of claim 1, wherein applying the machine-learning model comprises:

ranking, based at least in part on one or more preferences of the user, the list of eligible products to identify a rank for each product in the list of eligible products;

selecting, based at least in part on the identified rank for each product in the list of eligible products, a subset of products from the list of eligible products; and mapping the selected subset of products to the set of items stored in the database.

8. The method of claim 1, wherein applying the machine-learning model comprises:

ranking, based at least in part on a location of a corresponding retailer associated with each item in the list of eligible items, the list of eligible items to identify a rank for each item in the list of eligible items;

selecting, based at least in part on the identified rank for each product in the list of eligible products, a subset of products from the list of eligible products; and mapping the selected subset of products to the set of items stored in the database.

9. The method of claim 1, further comprises:

accessing a second machine-learning model trained to predict, based on at least one of one or more features of each item in the set of items or information about a corresponding retailer associated with each item in the set of items, a likelihood for availability of each item in the set of items;

applying the second machine-learning model to the predicted likelihood for availability to generate an availability score for each item in the set of items; and selecting, based at least in part on the availability score for each item in the set of items, a subset of items from the set of items for populating the collection of items.

10. A computer program product comprising a non-transitory computer readable storage medium having instructions encoded thereon that, when executed by a processor, cause the processor to perform steps comprising:

obtaining a text describing a theme around which a collection of items is to be built;

generating a prompt for input into a language model, the prompt including information about a plurality of items and the text describing the theme;

requesting the language model to generate, based on the prompt input into the language model, a list of products eligible for building the collection of items;

accessing a machine-learning model trained to identify a set of items personalized for a user of an online system;

applying the machine-learning model to the list of eligible products and information about the user to identify the set of items for populating the collection of items;

storing, into a database of a computer system, the collection of items as an extensible markup language (XML) object that includes a text and a plurality of images, the plurality of images represented by uniform resource locator (URL) hypertext reference (HREF) attribute links and associated with items in the collection of items, the text associated with the XML object including a personalized title for the collection of items;

loading the XML object from the database, wherein the loading includes using the URL HREF attribute links to load each of the plurality of images for presentation of each item of the collection of items; and upon loading the XML object from the database, converting the XML object into a JavaScript Object Notation (JSON) object that causes a device associated with the user to display a user interface with each item of the collection of items including the personalized title for the collection of items and the plurality of images for inclusion of one or more items of the collection of items into a cart of the user.

11. The computer program product of claim 10, wherein the instructions further cause the processor to perform steps comprising:

identifying at least one of a list of trending items or a list of trending search queries associated with the online system;

generating a second prompt for input into the language model, the second prompt including the at least one of the list of trending items or the list of trending search queries; and requesting the language model to generate, based on the second prompt input into the language model, the text describing the theme.

12. The computer program product of claim 10, wherein the instructions further cause the processor to perform steps comprising:

generating the prompt for input into the language model by including in the prompt at least one of a name of the theme or a description of the theme.

13. The computer program product of claim 10, wherein the instructions further cause the processor to perform steps comprising:

generating the prompt for input into the language model by further including in the prompt at least one of a type of a cohort the user belongs to, one or more brands preferred by the user, or a geographic location of the user.

14. The computer program product of claim 10, wherein the instructions further cause the processor to perform steps comprising:

retrieving, from the database, information about the plurality of items historically associated with the theme.

15. The computer program product of claim 10, wherein the instructions further cause the processor to perform steps comprising:

applying the machine-learning model to information about one or more preferences of the user to rank the list of eligible products for identifying a rank for each product in the list of eligible products;

selecting, based at least in part on the identified rank for each product in the list of eligible products, a subset of products from the list of eligible products; and mapping the selected subset of products to the set of items stored in the database.

16. The computer program product of claim 10, wherein the instructions further cause the processor to perform steps comprising:

applying the machine-learning model to information about a location of a corresponding retailer associated with each item in the list of eligible items to rank the list of eligible items for identifying a rank for each item in the list of eligible items;

selecting, based at least in part on the identified rank for each product in the list of eligible products, a subset of products from the list of eligible products; and mapping the selected subset of products to the set of items stored in the database.

17. The computer program product of claim 10, wherein the instructions further cause the processor to perform steps comprising:

accessing a second machine-learning model trained to predict, based on at least one of one or more features of each item in the set of items or information about a corresponding retailer associated with each item in the set of items, a likelihood for availability of each item in the set of items;

applying the second machine-learning model to the predicted likelihood for availability to generate an availability score for each item in the set of items; and selecting, based at least in part on the availability score for each item in the set of items, a subset of items from the set of items for populating the collection of items.

18. A computer system comprising:

a processor; and a non-transitory computer-readable storage medium having instructions that, when executed by the processor, cause the computer system to perform steps comprising:

obtaining a text describing a theme around which a collection of items is to be built;

generating a prompt for input into a language model, the prompt including information about a plurality of items and the text describing the theme;

requesting the language model to generate, based on the prompt input into the language model, a list of products eligible for building the collection of items;

accessing a machine-learning model trained to identify a set of items personalized for a user of an online system;

applying the machine-learning model to the list of eligible products and information about the user to identify the set of items for populating the collection of items;

storing, into a database of the computer system, the collection of items as an extensible markup language (XML) object that includes a text and a plurality of images, the plurality of images represented by uniform resource locator (URL) hypertext reference (HREF) attribute links and associated with items in the collection of items, the text associated with the XML object including a personalized title for the collection of items;

loading the XML object from the database, wherein the loading includes using the URL HREF attribute links to load each of the plurality of images for presentation of each item of the collection of items; and upon loading the XML object from the database, converting the XML object into a JavaScript Object Notation (JSON) object that causes a device associated with the user to display a user interface with each item of the collection of items including the personalized title for the collection of items and the plurality of images for inclusion of one or more items of the collection of items into a cart of the user.

* * * * *